United States Patent [19]

Kawase et al.

[11] Patent Number: 5,443,585
[45] Date of Patent: Aug. 22, 1995

[54] GUN DRILL

[75] Inventors: Haruo Kawase; Katsunori Matsumoto; Shinichi Nakamura, all of Gifu, Japan

[73] Assignee: Mitsubishi Materials Corporation, Tokyo, Japan

[21] Appl. No.: 266,706

[22] Filed: Jun. 28, 1994

[30] Foreign Application Priority Data

Feb. 25, 1994 [JP] Japan ................... 6-028543

[51] Int. Cl.$^6$ ............................................. B23B 51/00
[52] U.S. Cl. .................... 408/199; 408/211; 408/223; 408/229; 408/705
[58] Field of Search ............... 408/199, 211, 223, 226, 408/227, 229, 705

[56] References Cited

U.S. PATENT DOCUMENTS

| | | | |
|---|---|---|---|
| 4,373,839 | 2/1983 | Negishi et al. | 408/233 |
| 4,395,169 | 7/1983 | Kashiwagi et al. | 408/705 |

FOREIGN PATENT DOCUMENTS

| | | | |
|---|---|---|---|
| 9811 | 1/1987 | Japan | 408/199 |
| 34712 | 2/1987 | Japan | 408/199 |
| 47004 | 2/1988 | Japan | 408/199 |
| 102813 | 5/1988 | Japan | 408/199 |

*Primary Examiner*—Daniel W. Howell
*Attorney, Agent, or Firm*—Armstrong, Westerman, Hattori, McLeland & Naughton

[57] ABSTRACT

A cutting edge 18 is provided on the end of a cutter tip 12 on a gun drill body 1. The cutting edge 18 has: a radially inner region providing a convex curved cutting edge portion 23, a radially outer region providing a straight cutting edge portion 19 and an intermediate region which provides a concave cutting edge portion 22 having a tapered portion 20 and a concave portion 21. The convex curved cutting edge portion 23, when viewed in the direction of the axis O, presents an arc shape, the radius R of the curvature of which is determined in relation to the outside diameter D of the gun drill so as to range from $0.1 \times D$ to $0.4 \times D$. Thus, a gun drill is provided which exhibits an enhanced severing effect to cut metal chips into pieces so as to prevent clogging, as well as to prevent an increase in the cutting resistance, thus meeting the demand for a greater feed rate.

6 Claims, 2 Drawing Sheets

GUN DRILL

BACKGROUND OF THE INVENTION

The present invention relates to a gun drill which is used in drilling a long bore in, for example, steel and, more particularly, to a gun drill improved to enable drilling with a greater feed rate.

A. Description of the Related Art

A gun drill of the kind described, in particular a gun drill suitable for a large feed rate, is enclosed in Japanese Utility Model Laid-Open No. 4-70418 of the same applicant as this application.

In this gun drill, a cutter tip brazed to a shank has a cutting edge formed on the end thereof, wherein the cutting edge has a curved cutting edge portion which is adjacent to the axis of rotation and which is convex in the forward direction of rotation when viewed in the axial direction from the side adjacent to the free end of the cutter tip, a radially outermost straight cutting edge portion which is on an imaginary plane containing the axis of rotation, and a concave edge portion which is intermediate between the straight cutting edge portion and the curved cutting edge portion, the concave cutting edge portion including a slant portion connected to the straight cutting edge portion and slanted backward as viewed in the rotation direction towards the axis of rotation and a concave portion which interconnects the radially inner end of the slant portion and the convex curved cutting edge portion. The height of the convex curved cutting edge portion from the above-mentioned imaginary plane is determined in the relation to the diameter of rotation of the outer peripheral end of the straight cutting edge portion, i.e., the diameter D of the gun drill, such as to fall within the range between $0.03 \times D$ and $0.06 \times D$. At the same time, the radial width of the portion of the convex curved cutting edge portion projecting forward toward the rotation direction beyond the imaginary plane is determined to range between $0.25 \times D$ and $0.35 \times D$. Furthermore, the angle formed by the tapered portion of the concave cutting edge portion is determined to range between 5° and 30°. According to this arrangement, it is possible to promote the discontinuation or severance of the cut metal chip while suppressing an increase in the cutting resistance, thus achieving a greater feed of the drill.

Table 1 shows the results of a test drilling conducted by using a gun drill which is disclosed in the above-mentioned Utility Model Laid-Open Publication. In this table, a mark O indicates that the drilling was preformed in a good manner without any trouble, a mark Δ indicates that the drilling was rather unstable due to vibration or seizure of the cut metal chips although the drilling was not impossible, and a mark x indicates that the drilling was materially impossible due to clogging with the cut metal chips or increase in the cutting resistance. The test drilling was carried out at a cutting rate of 70 m/min, using SCM 440 (HB 260) as the material of the work subjected to the drilling.

TABLE 1

| | | | | | | | | |
|---|---|---|---|---|---|---|---|---|
| 12 | O | O | O | O | O | O | Δ | X |
| 10 | O | O | O | O | O | Δ | Δ | X |
| 8 | O | O | O | O | Δ | Δ | X | |
| 6 | O | O | O | Δ | Δ | X | | |
| Cutting edge dia. | 0.02 | 0.04 | 0.06 | 0.08 | 0.10 | 0.12 | 0.14 | 0.16 |
| Feed | | | | | | | | |

TABLE 1-continued (mm/rev)

From Table 1, it is understood that the gun drill of the type disclosed in the above-mentioned Publication can perform good drilling even at a large feed rate of 0.12 mm/rev when the cutting edge diameter (diameter D of the gun drill) is 12 mm, and a feed rate of 0.06 mm/rev can be maintained even when the gun drill diameter D is as small as 6 mm. In contrast, the conventional gun drill, which was known prior to the filing of the application of the above-mentioned Utility Model, showed a lack of stability in the drilling when the feed rate exceeded 0.06 m/rev, when the diameter of the cutting edge was 12 mm or so. Thus, the gun drill shown in the above-mentioned Publication exhibits an improved cutting performance over the conventional gun drill.

B. Problems Solved by the Invention

In recent years, there has been an increasing demand for gun drills which can perform boring at further increased feed rates, in order to cope with current requirements for higher efficiency and higher speed of machining.

The present inventors have conducted various experiments with a view to achieving a higher feed rate based on the known drill disclosed in the above-mentioned Japanese Utility Model Publication of the same applicants. As a result, the present inventors have discovered that, by enabling more efficient severance of a cut metal chip and control of the direction of the flow of the cut metal chip, a cut metal chip which is generated at a greater rate during machining at a higher feed rate can be smoothly discharged, thus preventing an increase in the cutting resistance attributable to clogging of the cut metal chip, as well as preventing seizure of the cut metal chip attributable to a rise of the temperature in the bore which is being drilled, thereby enabling drilling at a greater feed rate.

The present invention is based upon the above-described discovery and is aimed at providing a gun drill which can operate with a greater feed rate than the above-described known gun drill, thereby achieving further improvement in the cutting performance.

SUMMARY OF THE INVENTION

The above-mentioned experiments were conducted with specific consideration given to the configuration of the curved cutting edge portion which is the portion of the cutting edge adjacent to the axis of rotation of the drill and which is convex forward in the direction of drill rotation. Thus, experiments were conducted by employing drills having various shapes of the curved cutting edge portion. As a result, the inventors found that a greater effect of severing the cut metal chip is attainable when the convex curved cutting edge portion has an arc form when viewed in the axial direction from the side adjacent to the cutting end of the drill, the arc having a radius of curvature which is not greater than $0.4 \times D$.

With this knowledge, the present invention provides a gun drill comprising a shaft-like shank rotatable about its axis, and a cutter tip brazed to the free end of the shank, the cutter tip having a cut chip discharge flute formed in the side wall thereof extending from the free end towards the base end of the tip, the cutter tip further having a cutting edge formed on an edge line where the wall of the flute facing forward as viewed in the direction of rotation of the shank intersects an end relief surface, wherein the cutting edge has a convex curved cutting edge portion which is adjacent to the axis of rotation and which is convex in the forward direction of rotation when viewed in the axial direction from the side adjacent to the free end of the cutter tip, a radially outermost straight cutting edge portion which is on an imaginary plane containing the axis of rotation, and a concave cutting edge portion which is intermediate between the straight cutting edge portion and the convex cutting edge portion, the concave cutting edge portion including a slant portion connected to the straight cutting edge portion and slanted backward as viewed in the rotation direction towards the axis of rotation and a concave portion which interconnects the radially inner end of the slant portion and the curved cutting edge portion, the curved cutting edge portion presenting an arc form when viewed in the axial direction, the radius of the curvature of the arc form being determined in relation to the diameter D of the gun drill so as to fall within the range from $0.1 \times D$ and $0.4 \times D$.

In the gun drill of the present invention, the curved cutting edge portion adjacent to the axis of rotation of the drill has an arc form with a radius of curvature which is determined in relation to the outside diameter D of the gun drill so as to not be greater than $0.4 \times D$, whereby the effect of severing the cut metal chip is further enhanced. This remarkable effect is considered to be attributable to the fact that the arc-shaped cutting edge portion provides a more isometric generation of severance stress to the cut metal chip than other convex shapes, such as part of an ellipse of the curved cutting edge portion.

More specifically, when the curved cutting edge portion has a shape other than an arc, e.g., elliptic, the radius of the curvature varies according to the position along the cutting edge. The portion of the cut metal chip generated on the region of the curved cutting edge portion where the radius of curvature is small can be well severed because the stress is concentrated to this portion of the cut metal chip, whereas, the portion of the cut metal chip generated on the region where the radius of the curvature is large cannot be severed because the cut metal chip is generated in a comparatively flattened form. In contrast, when the convex curved cutting edge portion is arc-shaped, the radius of curvature is constant over the entire region of the convex cutting edge portion, so that the cut metal chip is isometrically stressed so as to be severed into discrete chips.

When the radius of curvature of the arc shape of the curved cutting edge portion exceeds $0.4 \times D$, the curved cutting edge portion generally has a rather flat form, rather than an arc, due to too a large radius of curvature. In such a case, the level of the stress generated in the cut metal chip is correspondingly small, so that the severance effect is extremely reduced to significantly impair the disposal of the cut metal chip. Conversely, when the radius of curvature of the arc is smaller than $0.1 \times D$, the proportion of the convex curved cutting edge portion to the entire cutting edge is too small, which makes it meaningless to provide the convex curved cutting edge portion. In addition, the curved cutting edge portion becomes too sharp, which increases the risk of breakage of the cutting edge, particularly in the portion around the end extremity which projects forward in the direction of drill rotation.

The above and other (a) objects, (b) advantages, (c) features and (d) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 1:
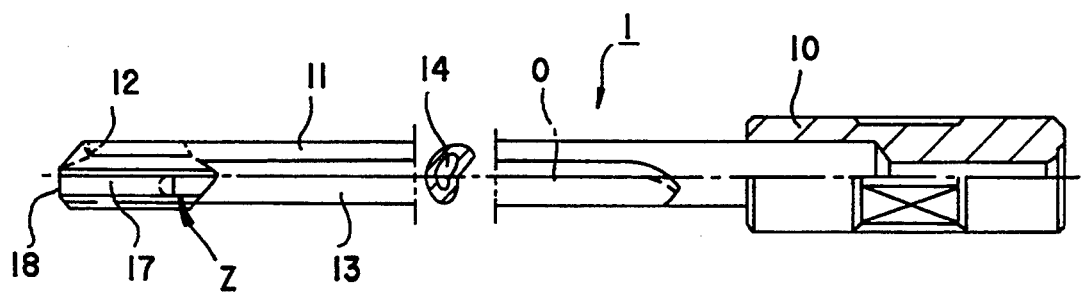
FIG. 1 is a side elevational view of an embodiment of the present invention.
Figure 2:
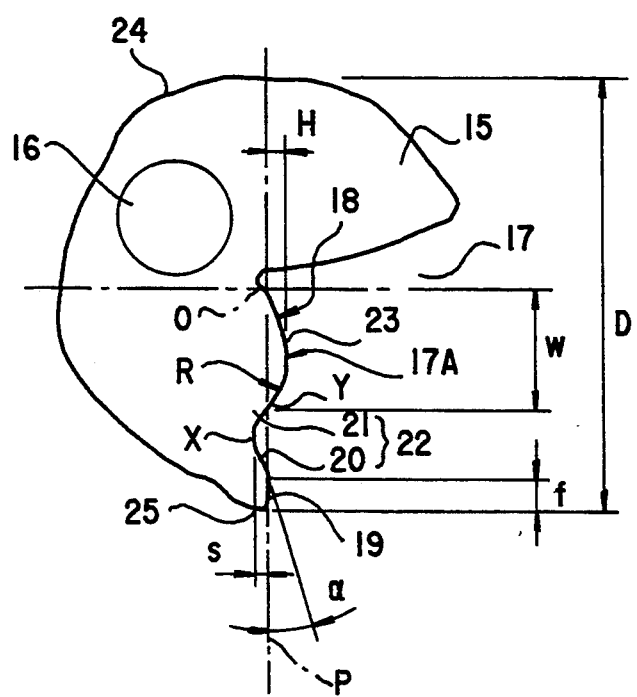
FIG. 2 is an enlarged end view of the embodiment shown in FIG. 1, as viewed in the direction of an axis O from the side adjacent to the cutting end of the drill.
Figure 3:
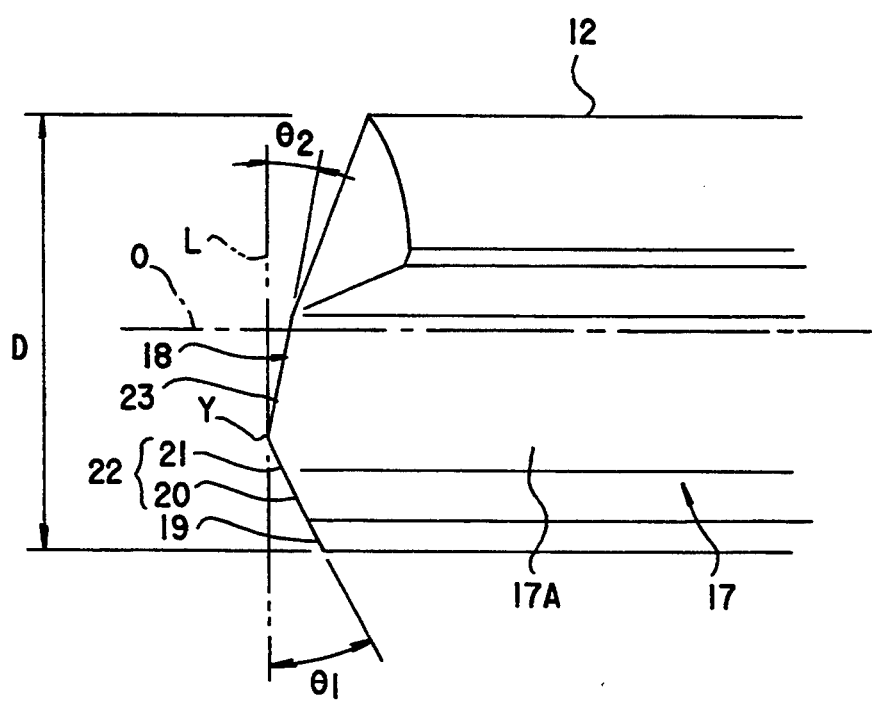
FIG. 3 is an enlarged side elevational view of the embodiment shown in FIG. 1, as viewed in the direction perpendicular to the imaginary plane P.

FIGS. 1 to 3 show an embodiment of the present invention. In these Figures, reference numeral 1 denotes the body of a gun drill embodying the present invention, while 10 denotes a drill mount which is attached to a rotary portion of a cutting apparatus and rotatable about an axis O of the drill body 1. The drill body includes a shank 11 fixed in the end of the drill mount 10 and a cemented or ultra-hard tip 12 is brazed to the end of the shank 11. A cut chip discharge flute 13 having a generally V-shaped cross-section is formed in the side face of the shank 11. In addition, an oil supply bore 14 having a cross-section similar to that of the shank 11 is formed in the shank 11.

An oil port 16 communicating with the oil supply bore 14 is formed in the ultra-hard tip 12 so as to open into the end surface 15 of the tip 12. In addition, a cut ship discharge flute 17 continuing to the flute 13 formed in the shank 11 is formed in the side surface of the tip 12. A cutting edge 18 having a predetermined cut edge angle and a predetermined relief angle is formed on the edge line where the wall surface 17A of the flute 17 facing forward as viewed in the direction of drill rotation intersects the end surface 15 of the ultra-hard tip 12.

The cutting edge 18 is constructed so that the radially outermost region of the cutting edge 18 provides a straight cutting edge portion 19 which is positioned on an imaginary plane 18 containing the axis O. "D" represents the diameter of the rotation of the outer end of the straight cutting edge portion 19 about the axis O, i.e., the outside diameter of the gun drill. The length "f" of the straight cutting edge portion 19 is determined to be approximately $0.05 \times D$.

A slant portion 20 is provided, which, when viewed in the direction of the axis O from the side adjacent to the free end of the tip 12, is substantially linearly tapered in the trailing direction from the direction of drill rotation (drill rotation direction is counterclockwise as viewed in FIG. 2) along the cutting edge towards the axis of rotation, and is connected to the radially inner end, i.e., the end closer to the axis of rotation, of the straight cutting edge portion 19. A concave curved portion 21, which is recessed to the trailing side away from the direction of drill rotation, is connected to the radially inner end of the tapered portion 20. The concave curved portion 21 and the tapered portion 20 in cooperation form a concave cutting edge portion 22.

In the described embodiment of the present invention, the slant portion 20 and the concave curved portion 21 are so formed as to be continuous, i.e., so as to be smoothly connected to each other, and the point X where these two portions meet each other provides the bottom of the concave cutting edge portion 22 which is remotest from the above-mentioned imaginary plane P. The depth "s" of the concave cutting edge portion 22, measured from the imaginary plane P to the above-mentioned point X, is determined in relation to the outside diameter D of the gun drill so as to range between $0.01 \times D$ and $0.05 \times D$. In the illustrated embodiment, the angle $\alpha$ formed between the slant portion 20 of the concave cutting edge portion 22 and the imaginary pane P, as viewed in the direction of the axis O, is determined to be from 5° to 30°.

A convex curved cutting edge portion 23, which is convex in the forward direction to the drill rotation direction, is formed so as to be connected to the end closest to the axis of rotation, i.e., the radially inner end, of the concave cutting edge portion 22. The convex curved cutting edge portion 23 and the concave cutting edge portion 22 are smoothly connected to each other.

The convex curved cutting edge portion 23 is so formed that the central portion thereof projects forward toward the direction of drill rotation beyond the above-mentioned imaginary plane P which contains the axis O and on which the straight cutting edge 19 is formed. The height H of the convexity as measured from the imaginary pane P is to be from $0.03 \times D$ to $0.06 \times D$, where D represents the outside diameter of the gun drill D. The radial width "W" of the portion of the convex curved cutting edge portion 23 projecting beyond the imaginary plane P is determined in relation to the gun drill outside diameter D so as to range from $0.25 \times D$ to $0.35 \times D$. Furthermore, the radially innermost portion of the convex curved cutting edge portion 23 closest to the axis O is radially spaced from the axis O by a distance which is from 0.05 mm to 0.15 min.

In the illustrated embodiment, the above-described requirements are met and, in addition, the convex curved cutting edge portion 23 is formed to have an arc shape when viewed in the direction of the axis O from the side adjacent to the cutting end of the drill. The arc has a radius R of curvature which is determined in relation to the outside diameter D of the gun drill so as to range from $0.1 \times D$ to $0.4 \times D$.

The cutting edge 18, as viewed in FIG. 3, i.e. in the side elevation perpendicular to the imaginary plane P, has such a mountain shape wherein the cutting edge progressively and linearly tapers to project away from the base end of the drill to a crest point Y and then tapers back towards the base end of the drill, as shown in FIG. 3. Thus, the crest point Y provides the end extremity of the mountain-shaped cutting edge. In the illustrated embodiment, the position of the crest point Y substantially coincides with a point where the imaginary plane P intersects the convex curved cutting edge portion 23 when viewed in the direction of the axis O, as shown in FIG. 2.

Referring to FIG. 3, an imaginary straight line L passes the above-mentioned crest Y and extends perpendicularly to the axis O. The angle $\theta_1$ is formed between the imaginary straight line L and the line presented by the region of the cutting edge 18 which is on the radially outer side of the crest point Y (the region constituted by the straight cutting edge portion 19 and the concave cutting edge portion 22) as viewed in FIG. 3, i.e., in the side elevation mentioned above. The angle formed between the above-mentioned imaginary straight line L and the line presented by the region of the cutting edge 18 which is on the radially inner side of the crest point Y (the region constituted by the convex curved cutting edge 23), when viewed in the same side elevation, is represented by $\theta_2$ as shown in FIG. 3. The angle $\theta_1$ is determined to be at least two times greater than the angle $\theta_2$. Thus, a relationship expressed by $\theta_1 \geq 2 \times \theta_2$ exits between angles $\theta_1$ and $\theta_2$.

The rake surface connected to the cutting edge 18, i.e. the wall surface 17A of the chip discharge flute 17 facing forward toward the direction of drill rotation, is so shaped that it exhibits the same cross-sectional shape as the cutting edge 18 when taken along a plane perpendicular to the axis O, over an axial region of a length of $1.2 \times D$ to $3.0 \times D$ starting from the end extremity of the wall surface 17A towards the base end thereof. The portion of the wall surface 17A connected to and extending rearwardly from the convex curved cutting edge portion 23 is cut-away in the axial region of the wall surface 17A beyond the above-mentioned length, i.e. at point Z shown in FIG. 1, whereby the surface 17A is substantially flattened, thus providing a greater cross-sectional area of the cut chip discharge flute 17 in the region near the base end of the drill. This arrangement may be modified such that the cross-sectional area of the semi-cylindrical portion connected to and extending rearwardly from the arc-shaped convex curved cutting edge portion 23 progressively decreases towards the base end of the drill in the region beyond the axial length of $0.2 \times D$ to $3.0 \times D$. Obviously, the semi-cylindrical portion connected to the arc-shape semi-cylindrical cutting edge portion 23 may extend to the base end of the drill without decreasing its cross-sectional area.

In the drawing, reference numeral 24 denotes a pad which serves as a rotary guide of the gun drill. The outside diameter D of the gun drill is determined by the pad 24 and an outer peripheral margin 25 which is formed on the trailing side of the straight cutting edge portion 19 behind the drill rotation direction.

In the gun drill having the described construction, the effective height of the convex curved cutting edge portion 23 is increased because of the concave cutting edge portion 22 on the radially outer side of the convex curved cutting edge portion 23. It is, therefore, possible to attain a large effect to severe a cut metal chip, even though the above-mentioned amount H of projection of the convex curved cutting edge portion is reduced to suppress an increase in the cutting resistance. Furthermore, since the concave cutting edge portion 22 is composed of the radially outer slanted portion 20 and the radially inner concave portion 21, it is possible to reduce the radius of curvature of the concave portion 21. The metal chip cut by the radially outer portion of the cutting edge is sharply curled by the wall surface continuing from the concave portion 21, whereby the severance effect is further enhanced.

Furthermore, since the convex curved cutting edge portion 23 has an arc shape when viewed in the direction of the axis O from the side adjacent to the cutting end of the drill, and since the radius R of curvature of the arc shape is determined to be from $0.1 \times D$ to $0.4 \times D$, a superior chip severance effect is stably produced even when the drilling is conducted at a high rate, for the reasons stated above.

Test drilling operations were conducted which obtained the results as shown in Table 2, by using the gun drill of this embodiment, under the same testing conditions as those of the drilling test with known gun drills explained before in connection with Table 1. Thus, the material of the work subjected to the test drilling was CM 440 (HB 260), and the cutting speed was 70 m/min. The symbols indicating the result of the evaluation are the same as those shown in Table 1.

TABLE 2

| | | | | | | | | |
|---|---|---|---|---|---|---|---|---|
| 12 | ○ | ○ | ○ | ○ | ○ | ○ | ○ | Δ |
| 10 | ○ | ○ | ○ | ○ | ○ | ○ | ○ | Δ |
| 8 | ○ | ○ | ○ | ○ | ○ | ○ | Δ | X |
| 6 | ○ | ○ | ○ | ○ | ○ | Δ | X | X |
| Cutting edge dia. | 0.02 | 0.04 | 0.06 | 0.08 | 0.10 | 0.12 | 0.14 | 0.16 |
| Feed (mm/rev) | | | | | | | | |

A comparison between the test results shown in Tables 1 and 2 proves the following facts.

Both the known gun drill and the gun drill of the described embodiment provide a superior cutting effect when the diameter of the cutting edge is comparatively large and when the feed rate is comparatively small. However, as shown in Table 1, the cutting operation is rendered unstable when the feed rate is increased, due to impediment to the disposal of the cut metal chip which causes stagnation of the cut metal ship in the drilled bore so as to cause a seizure of the chip and vibration of the drill. A further increase in the feed rate causes a rather early clogging with the cut metal chips, making it impossible to further continue the drilling.

As shown in Table 2, the gun drill of the described embodiment exhibits the same tendency as the known gun drill in that the drilling is rendered unstable when the feed rate is increased, and finally the drilling fails. It is to be noted, however, that the limit of the increase in the feed rate at which the drilling becomes unstable is much higher than that in the known gun drill. Thus, the gun drill of the invention can be used satisfactorily at a feed rate which is much greater than the limit feed rate of the known gun drill, thus demonstrating advantageous effects produced by the present invention.

In the gun drill of the described embodiment, the convex curved cutting edge portion 23 has an arc shape when viewed in the direction of the axis O from the side adjacent to the cutting end of the drill, and the radius R of curvature of the arc shape is determined to be from $0.1 \times D$ to $0.4 \times D$. When the radius R of curvature is increased beyond $0.4 \times D$, the drilling is rapidly rendered unstable and drilling failure due to clogging with the cut metal chip is caused at a comparatively small feed rate, even when the diameter of the cutting edge is unchanged. The natures of the cut metal chips discharged from the drill were examined and compared according to the radius R of curvature. The cut metal chips were well severed into small pieces when the radius R of curvature fell within the above-mentioned range, whereas, when the radius R of curvature exceeded this range, the cut metal chips were not sufficiently severed. It is, thus, understood that such non-severed cut metal chips clog in the flute to cause an early drilling failure.

A test was also conducted for a gun drill which has a radius R of curvature less than $0.1 \times D$. In this case, the convex curved cutting edge portion was fractured even at a comparatively small rate of feed, making it impossible to further continue the drilling. In addition, only a few cut metal chips could be satisfactorily severed by the convex curved cutting edge portion.

In the gun drill of the described embodiment, the depth S in terms of the distance between the imaginary plane P and the bottom of the concave cutting edge portion 22 is determined to range between $0.01 \times D$ and $0.05 D$, in order to reduce cutting resistance encountered during drilling.

More specifically, the slant portion 20 forming part of the concave cutting edge portion 22 is tapered with respect to the imaginary plane P towards the trailing side behind the drill rotation direction radially inward from the straight cutting edge portion 19, thus presenting a positive radial rake angle $\alpha$. This angle $\alpha$ is determined by the above-mentioned depth S and the radial length of the slant portion 20. More specifically, a greater depth S provides a greater positive value of the angle or, thus contributing to reduction in the cutting resistance.

Too large of a value of the depth S, however, causes the slope of the cutting edge between the bottom of the concave cutting edge portion 22 and the convex curved cutting edge portion 23 past the concave portion 21 to rise too steeply. Consequently, the cut metal chip is caused to strongly rub against the wall surface 17A of the cut metal chip discharge flute 17 connected to this portion of the cutting edge. This does not cause any substantial problem when the cutting speed is high. However, when the cutting speed is low, the cut metal chip cannot move beyond the convex curved cutting edge portion 23 due to the too steep slope mentioned above. Consequently, clogging of the cut metal chip occurs on this slope, not to mention failure in the severance of the cut metal chip, resulting in an increase in the cutting resistance.

Conversely, when the depth S is too small, the cut metal chip which is generated at a large rate during high-speed drilling cannot be broken effectively, so that the effect to severe the cut metal chip is impaired.

The present inventors have conducted various experiments to seek for an optimum depth S and have found that, when the depth S is set to range from $0.01 \times D$ to $0.05 \times D$, it is possible to preserve a certain rake angle $\alpha$ to effectively reduce the cutting resistance, while preventing the slope around the concave portion 21 of the concave cutting edge portion 22 from becoming too steep, thus preventing clogging while maintaining a sufficient chip braking effect even during high-speed drilling.

In the described embodiment of the present invention, the cutting edge 18, when viewed in FIG. 3, i.e. in a side elevation in the direction perpendicular to the imaginary plane P, presents such a mountain shape wherein the crest point Y projects to provide end extremity of the drill, the crest portion Y substantially coinciding with the point where the imaginary plane P and the convex curved cutting edge portion 23 of the cutting edge 18 intersect each other.

This arrangement allows the metal chip cut by the region of the cutting edge radially inside of the crest point Y to be smoothly guided to the region radially outside the crest point Y, while allowing the metal chip cut by the region of the cutting edge radially outside the crest point Y to smoothly flow radially inward. This tendency is enhanced by the fact that, when the drill is viewed in the direction of the axis O from the side adjacent to the cutting end of the drill, i.e. as seen in FIG. 2, the portion of the convex cutting edge portion 23 which is on the radially inner side of the crest point Y faces radially outward, while the tapered portion 20 of the concave cutting edge portion 22 connected to the crest point Y through the concave portion 21 faces radially inward.

Thus, the cut metal chips generated by the regions of the cutting edge on both sides of the crest point Y flow in counter radial directions so as to interfere with each other, which promotes severance of these cut metal chips. By controlling the flows of the cut metal chips in the described manner, it is possible to further improve the performance for disposing the cut metal chips.

In this embodiment, therefore, the chip severance effect can be stably maintained even during machining at a high feed rate at which the cut metal chips usually tend to be discharged without being severed into pieces. This effect, together with the advantages described above, makes the gun drill adaptable to uses at further increased feed rates.

Furthermore, in the described embodiment, the angle $\theta_1$ formed between the radially outer region of the cutting edge 18 and the imaginary line L which extends perpendicularly to the axis O past the crest point Y is set to be at least two times as large the angle $\theta_2$ formed between the imaginary line L and the region of the cutting edge 18 radially inside the crest point Y.

Consequently, the cut metal chip generated on the region of the cutting edge 18 radially outside the crest point Y is made to flow at a greater angle towards the radially inner end so as to interfere with the cut metal chip generated on the region of the cutting edge 18 radially inside the crest point Y, and is curled along the radially outwardly facing portion of the wall surface 17A of the cut chip discharge flute 17 connected to the convex curved cutting edge portion 23. In this embodiment, therefore, it is possible to securely control the flow of the cut metal chips so as to maintain and improve the effect to sever the cut metal chips. This effect, in combination with the advantages described above, provides a further improved performance for disposing the cut metal chips.

In operation, the radially outer region of the cutting edge generates cut metal chips at a greater ram per drill rotation than the radially inner region of the cutting edge due to the greater radius of rotation about the axis O. In the described embodiment, the cut metal chip generated on the radially outer region of the cutting edge 18 can be smoothly introduced into the radially inner region so as to be severed into pieces without delay, thus realizing a further smoothed disposal of the cut metal chips.

It is not preferred to set the angle $\theta_1$ of the radially outer region of the cutting edge to a value smaller than double of the angle $\theta_2$ of the radially inner region, because, in such a case, the effect of severing the cut metal chips produced by mutual interference of the chips is not appreciable.

As described above, the present invention provides a gun drill in which the cutting edge has: a curved cutting edge portion which is adjacent to the axis of rotation and which is convex in the forward direction of rotation when viewed in the axial direction from the side adjacent to the free end of the cutter tip, a radially outermost straight cutting edge portion which is on an imaginary plane containing the axis of rotation, and a concave cutting edge portion which is intermediate between the straight cutting edge portion and the curved cutting edge portion, the concave cutting edge portion including a slant portion connected to the straight cutting edge portion and slanted backward from the rotation direction towards the axis of rotation and a concave portion which interconnects the radially inner end of the slant portion and the radially outer end of the curved cutting edge portion, the curved cutting edge portion presenting an arc form when viewed in the axial direction, the radius of curvature of the arc form being determined in relation to the diameter D of the gun drill so as to fall within the range between $0.1 \times D$ and $0.4 \times D$. With this arrangement, the effect of severing the cut metal chips into pieces is enhanced to prevent clogging with the cut metal chips, as well as to increase the cutting resistance, whereby the gun drill can meet the current demand for a higher feed rate.

By setting the depth of the concave cutting edge portion as measured from the bottom thereof to the aforementioned imaginary plane in relation to the outside diameter D so as to meet the condition of $0.01 \times D$ to $0.05 \times D$, it is possible to reduce the cutting resistance while securely and stably achieving the chip severance effect.

Furthermore, in the described embodiment, the cutting edge when viewed in FIG. 3, i.e., in a side elevation in the direction perpendicular to the above-mentioned imaginary plane, presents a mountain-like shape in which the cutting edge progressively projects axially outward along the radial line from the radially inner end towards the radially outer end to a crest point and then tapers back again axially inward, i.e., towards the base end of the drill. The position of the crest point substantially coincides with the position of the point where the above-mentioned imaginary plane intersects the cutting edge. In addition, in the described embodiment, the angle formed by the radially outer region of the cutting edge with respect to an imaginary line orthogonal to the axis and passing through the crest point is set to be two or more times greater than that formed by the radially inner region of the same cutting edge, whereby the flow of the cut metal chips is optimally controlled to enhance the effect to sever the cut metal chips into pieces by, for example, mutual interference between the cut metal chips.

It will be apparent to those skilled in the art that the embodiments described may be varied as discussed above and in other manners, such as to meet particular specialized requirements, without departing from the true spirit and scope of the invention as claimed.

We claim:

1. A gun drill, comprising a shank which is rotatable about an axis of rotation and a cutter tip at an outer free end of said shank, said cutter tip having a cut chip discharge flute formed in a side wall thereof extending from an outer free end towards a base end of said tip, said cutter tip further having a cutting edge formed at an outer edge line of said flute facing forward in the direction of rotation of said shank, wherein said cutting edge has: a convex curved cutting edge portion which is adjacent to the axis of rotation and which is convex in the forward direction of rotation, as viewed in the axial direction from the free end of said cutter tip, a radially outermost straight cutting edge portion which is on an imaginary plane containing said axis of rotation, and a concave cutting edge portion which is intermediate between said straight cutting edge portion and said convex curved cutting edge portion, said concave cutting edge portion including a slant portion connected to said straight cutting edge portion and slanted backward from the rotation direction towards said axis of rotation and a concave portion which interconnects a radially inner end of said slat portion and a radially outer end of said convex curved cutting edge portion, said convex curved cutting edge portion having an arc shape as viewed in said axial direction, a radius of curvature of said arc-shape being between 0.1–0.4×the diameter D of said shank of said gun drill.

2. A gun drill according to claim 1, wherein a depth of said concave cutting edge portion, as measured from said imaginary plane on which said straight cutting edge portion is provided, to a bottom of said concave cutting edge portion, is within the range from 0.01×D to 0.05×D.

3. A gun drill according to claim 1, wherein said cutting edge, as viewed perpendicular to said imaginary plane on which said straight cutting edge portion is provided, has a pointed shape wherein said cutting edge progressively projects away from the base end of the drill in a region between the axis of rotation and a crest point which is between said axis of rotation and an outer peripheral end of said cutting edge and then retracts towards the base end from said crest point to said outer peripheral end, the position of said crest point substantially coinciding with a point where said imaginary plane intersects said cutting edge.

4. A gun drill according to claim 1, wherein said cutting edge, as viewed perpendicular to said imaginary plane on which said straight cutting edge portion is provided, has a pointed shape wherein said cutting edge progressively projects away from the base end of the drill in a region between the axis of rotation and a crest point which is between said axis of rotation and an outer peripheral end of said cutting edge and then retracts towards the base end of the drill from said crest point to said outer peripheral end, the position of said crest point substantially coinciding with a point where said imaginary plane intersects said cutting edge, and wherein an angle formed by an outer peripheral portion of said cutting edge, on a radial outer side of said crest point, with respect to an imaginary line which passes through said crest point and which is orthogonal to said axis, is at least two times greater than an angle formed by a portion of said cutting edge on a radial inner side of said crest point adjacent to said axis of rotation.

5. A gun drill according to claim 2, wherein said cutting edge, as viewed perpendicular to said imaginary plane on which said straight cutting edge portion is provided, has a pointed shape wherein said cutting edge progressively projects away from the base end of the drill in a region between the axis of rotation and a crest point which is between said axis of rotation and an outer peripheral end of said cutting edge and then retracts towards the base end from said crest point to said outer peripheral end, the position of said crest point substantially coinciding with a point where said imaginary plane intersects said cutting edge.

6. A gun drill according to claim 2, wherein said cutting edge, as viewed perpendicular to said imaginary plane on which said straight cutting edge portion is provided, has a pointed shape wherein said cutting edge progressively projects away from the base end of the drill in a region between the axis of rotation and a crest point which is between said axis of rotation and an outer peripheral end of said cutting edge and then retracts towards the base end of the drill from said crest point to said outer peripheral end, the position of said crest point substantially coinciding with a point where said imaginary plane intersects said cutting edge, and wherein an angle formed by an outer peripheral portion of said cutting edge, on a radial outer side of said crest point, with respect to an imaginary line which passes through said crest point and which is orthogonal to said axis, is at least two times greater than an angle formed by a portion of said cutting edge on a radial inner side of said crest point adjacent to said axis of rotation.

* * * * *